(12) United States Patent
Kim (10) Patent No.: US 11,398,784 B2
(45) Date of Patent: Jul. 26, 2022

(54) MOTOR DRIVING DEVICE FOR REDUCING LOAD ON ROTATING SHAFT

(71) Applicant: LG Electronics Inc., Seoul (KR)

(72) Inventor: Min Gi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 16/969,507

(22) PCT Filed: Dec. 18, 2018

(86) PCT No.: PCT/KR2018/016167
§ 371 (c)(1),
(2) Date: Aug. 12, 2020

(87) PCT Pub. No.: WO2019/156342
PCT Pub. Date: Aug. 15, 2019

(65) Prior Publication Data
US 2020/0403536 A1    Dec. 24, 2020

(30) Foreign Application Priority Data

Feb. 12, 2018  (KR) .......................... 10-2018-0017293

(51) Int. Cl.
  *H02P 1/04*      (2006.01)
  *H02K 11/33*     (2016.01)
  *H02K 1/16*      (2006.01)
  *H02K 3/28*      (2006.01)
  (Continued)

(52) U.S. Cl.
  CPC ............... *H02P 1/04* (2013.01); *H02K 1/165* (2013.01); *H02K 3/28* (2013.01); *H02K 3/48* (2013.01); *H02K 7/09* (2013.01); *H02K 11/33* (2016.01)

(58) Field of Classification Search
  CPC ........ H02P 25/28; H02P 2207/05; H02P 1/00; H02P 1/04; H02P 1/163; H02P 1/18;
  (Continued)

(56) References Cited

U.S. PATENT DOCUMENTS 6,635,976 B2 * 10/2003 Kanebako ........... F16C 32/0493
                                                         310/90.5
2001/0030471 A1   10/2001 Kanebako
(Continued)

FOREIGN PATENT DOCUMENTS

CN          1710782        12/2005
CN          1737388        2/2006
(Continued)

OTHER PUBLICATIONS

Extended European Search Report in European Appln No. 18905683.1, dated Oct. 13, 2021, 7 pages.
(Continued)

*Primary Examiner* — Antony M Paul
(74) *Attorney, Agent, or Firm* — Fish & Richardson P.C.

(57) ABSTRACT

A motor driving device which can reduce a load burden on a rotating shaft when a magnetic bearing is initially operated. When a rotor and a stator are initially aligned, the motor driving device can apply a greater current to a coil positioned farthest away from the ground among a plurality of coils than to the other coils, so as to reduce a levitation force necessary for initial alignment of the rotor and the stator.

20 Claims, 7 Drawing Sheets (51) Int. Cl.
  *H02K 3/48* (2006.01)
  *H02K 7/09* (2006.01)
(58) Field of Classification Search
  CPC ...... H02P 1/24; H02P 1/26; H02P 1/42; H02P 1/46; H02P 1/465; H02P 3/00; H02P 6/00; H02P 6/005; H02P 6/28; H02P 9/32; H02P 9/34; H02P 21/00; H02P 23/00; H02P 23/16; H02P 25/00; H02P 25/062; H02P 25/064; H02P 25/10; H02P 25/092; H02P 25/107; H02P 27/00; H02P 27/04; H02P 27/06
  See application file for complete search history.

(56) References Cited

U.S. PATENT DOCUMENTS

| | | |
|---|---|---|
| 2008/0315812 A1 | 12/2008 | Balboul |
| 2010/0231076 A1 | 9/2010 | Chiba et al. |
| 2012/0228965 A1 | 9/2012 | Bang et al. |

FOREIGN PATENT DOCUMENTS

| | | |
|---|---|---|
| CN | 101546947 | 9/2009 |
| CN | 103997176 | 8/2014 |
| CN | 104092411 | 10/2014 |
| CN | 204013145 | 12/2014 |
| CN | 204858842 | 12/2015 |
| CN | 105846624 | 8/2016 |
| CN | 106402159 | 2/2017 |
| CN | 106849401 | 6/2017 |
| CN | 106953459 | 7/2017 |
| CN | 107222131 | 9/2017 |
| CN | 108683292 | 10/2018 |
| CN | 113162315 | 7/2021 |
| DE | 3130974 | 2/1983 |
| EP | 1115194 | 7/2001 |
| JP | H03107615 | 5/1991 |
| JP | 05122895 | 5/1993 |
| JP | 2001190043 | 7/2001 |
| JP | 2004132513 | 4/2004 |
| JP | 2004140882 | 5/2004 |
| JP | 2017147783 | 8/2017 |
| KR | 1020080112955 | 12/2008 |

OTHER PUBLICATIONS

Office Action in Chinese Appln. No. 201880089205.8, dated Jan. 5, 2022, 18 pages (with English translation).

* cited by examiner

MOTOR DRIVING DEVICE FOR REDUCING LOAD ON ROTATING SHAFT

CROSS-REFERENCE TO RELATED APPLICATIONS

This application is a National Stage application under 35 U.S.C. § 371 of International Application No PCT/KR2018/016167, filed on Dec. 18, 2018, which claims the benefit of Korean Patent Application No. 10-2018-0017293, filed on Feb. 12, 2018. The disclosures of the prior applications are incorporated by reference in their entirety.

TECHNICAL FIELD

The present invention relates to a motor driving device capable of reducing a load burden on a rotating shaft when a magnetic bearing is initially operated.

BACKGROUND ART

Generally, a chiller system is a cooling device or refrigerating device which supplies cold water to an object requiring cold water such as an air conditioner, a refrigerator, or the like. The chiller system includes a compressor, a condenser, an expander, and an evaporator in which the refrigerant is circulated.

Here, the compressor includes a magnetic bearing which levitates a rotating shaft rotating in a motor using a magnetic force to compress a large amount of refrigerant at a high rate.

Here, referring to Korean Laid-Open Patent (KR 10-2015-0179994), a conventional chiller system is shown, and with reference to this, a compressor included in the conventional chiller system will be described.

Figure 1:
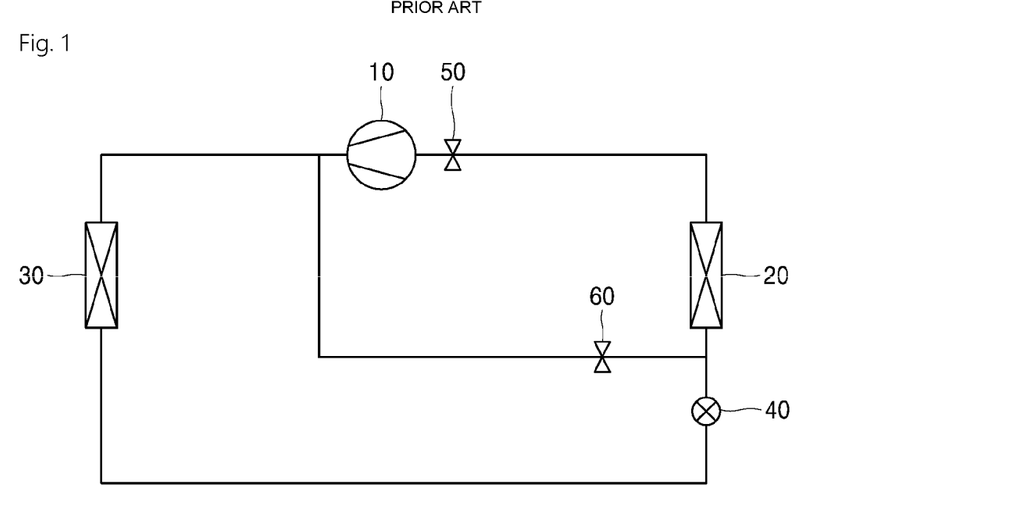
FIG. 1 is a view illustrating a conventional chiller system.
Figure 2:
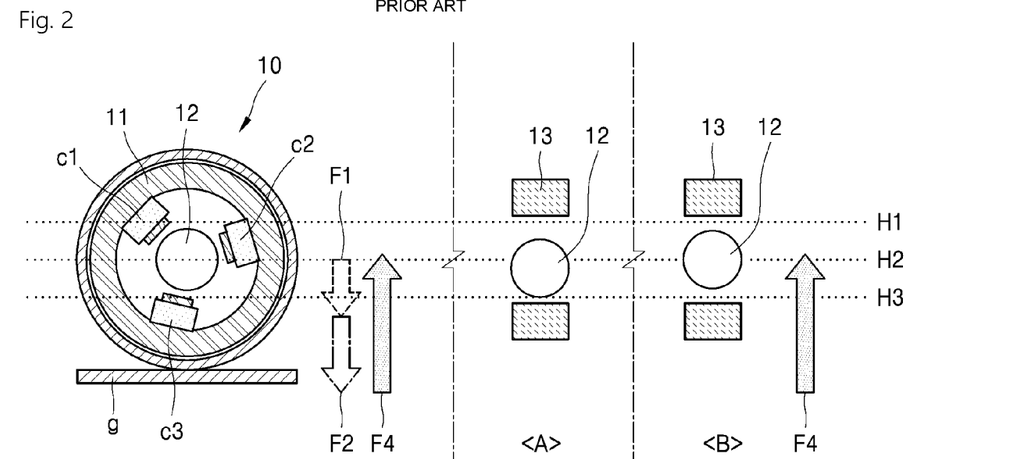
FIG. 2 is a cross-sectional view illustrating a compressor included in the chiller system in FIG. 1.

FIG. 1 is a view illustrating a conventional chiller system. FIG. 2 is a cross-sectional view illustrating a compressor included in the conventional chiller system in FIG. 1.

Referring to FIG. 1, the conventional chiller system includes a compressor 10 which compresses a refrigerant, a condenser 30 which condenses the refrigerant compressed in the compressor 10, an expansion valve 40 which expands the refrigerant condensed in the condenser 30, and an evaporator 20 which evaporates the refrigerant expanded in the expansion valve 40.

A suction valve 50 controls the flow of the refrigerant evaporated in the evaporator 20 and flowing to the compressor 10. A bypass valve 60 allows the refrigerant compressed by the compressor 10 to bypass to the evaporator 20 and controls the flow of the refrigerant which flows from the compressor 10 to the evaporator 20. Here, the bypass valve 60 and a pipe on which the bypass valve 60 is installed may be omitted.

Referring to FIG. 2, the compressor 10 includes a motor part composed of a stator 11 provided with a plurality of teeth and a rotor 12 which rotates in the stator 11.

The stator 11 is composed of a metal material. A plurality of coils C1, C2, and C3 are respectively wound around the plurality of teeth of the stator 11, and current flows through each of the plurality of coils C1, C2, C3, and thus a magnetic field is generated.

The rotor 12 is composed of a magnetic material having a magnetic force, and rotates due to the magnetic field generated by the plurality of coils C1, C2, and C3.

However, when the motor is in a stopped state, a first force F1 which acts downward due to the weight of the rotor 12 and a second force F2 which acts between the rotor 12 made of a magnetic material and the stator 11 made of a metal material are generated in the rotor 12.

The rotor 12 is moved downward from a center line H2 of the stator 11 by the first force F1 and the second force F2 (for example, a state A).

In order to drive the motor in the stopped state, a center of the rotor 12 and a center of the stator 11 should coincide with each other.

To this end, the motor part further includes magnetic bearings 13 which generate a magnetic force for moving the rotor 12 upward.

The magnetic bearings 13 are disposed at upper and lower sides of the rotor 12, and generate a third force F4 which pushes the rotor 12 to a center line H2 of the stator 11.

The center of the rotor 12 coincides with the center line H2 of the stator 11 due to the third force F4 (for example, a state B). That is, center lines of the rotor 12 and the stator 11 coincide with each other in an initial alignment process for driving the motor.

However, there is a problem in that the magnetic bearing 13 has to generate a greater levitation force as the weight of the rotor 12 increases and the magnetic force of the magnetic body constituting the rotor 12 increases.

Further, when the magnetic bearing 13 which generates a greater levitation force in the motor is provided, there is a problem in that an overall size and manufacturing costs of the motor increase, and many limitations in manufacturing a motor occur.

In addition, conventionally, there is a problem in that as positions of the teeth of the stator 11 are arbitrarily arranged, the magnitude of the levitation force which should be generated in the magnetic bearing 13 varies from motor to motor.

DISCLOSURE

Technical Problem

The present invention is directed to providing a motor driving device capable of reducing the magnitude of a levitation force necessary for initially aligning a rotor and a stator.

Further, the present invention is directed to providing a motor driving device capable of reducing sizes and manufacturing costs of magnetic bearings necessary for initially aligning a rotor.

In addition, the present invention is directed to providing a motor driving device capable of enhancing the reliability of motor control by unifying an alignment structure of a stator.

Purposes of the present invention are not limited to the above-mentioned purposes, and other purposes and advantages of the present invention which are not mentioned may be understood by the following description, and more clearly understood by examplary implementations of the present invention. Further, it may be easily understood that purposes and advantages of the present invention may be realized by means shown in the claims and a combination thereof.

Technical Solution

In a motor driving device according to the present invention, when a rotor and a stator are initially aligned, it is possible to reduce a levitation force necessary for initially aligning the rotor and the stator by applying a greater current to a coil disposed farthest away from the ground among a plurality of coils than to other coils.

Further, in the motor driving device according to the present invention, it is possible to reduce the magnitude of a levitation force generated in magnetic bearings by generating an additional levitation force through the magnetic bearings after applying the currents to the plurality of coils to generate the levitation force. Accordingly, sizes and manufacturing costs of the magnetic bearings included in a motor may be reduced.

In addition, in the motor driving device according to the present invention, it is possible to enhance the reliability of the motor control by uniformly disposing the plurality of teeth provided in the stator so that positions of the plurality of teeth becomes symmetrical to a reference line perpendicular to the ground.

Specifically, one aspect of the present invention provides a motor driving device including: a housing (105); a stator (110) fixed to an inner surface of the housing and including a plurality of teeth on which a plurality of coils are respectively wound; a rotor (120) disposed in the stator and rotating due to a magnetic field generated in the plurality of coils; a rotating shaft (125) extending in an axial direction of the rotor and horizontally disposed; magnetic bearings (130, 135) configured to generate a magnetic force which levitates the rotating shaft upward; and a controller configured to apply currents to the plurality of coils and control an operation of the magnetic bearings, wherein the controller applies currents having different magnitudes to the plurality of coils, and a first tooth on which the coil, forming the smallest angle with a line parallel to a gravitational acceleration direction among winding center axes on which the plurality of coils are respectively wound, is wound is disposed above the rotating shaft.

The plurality of teeth may include first to third teeth on which first to third coils are respectively wound, the first to third teeth may be disposed at an angle of the same interval based on the rotating shaft, and the first tooth may be disposed farther away from the ground in comparison with the second and third teeth.

The plurality of teeth may further include fourth to sixth teeth disposed opposite the first to third teeth based on the rotating shaft.

The first tooth may be disposed to be perpendicular to the ground which comes into contact with the housing or parallel to the gravitational acceleration direction.

The first tooth may be disposed in a range forming a first angle (θ) with a line (L2) perpendicular to the ground which comes into contact with the housing or a line parallel to the gravitational acceleration direction, and the first angle may be smaller than or equal to 60°.

The motor driving device may further include backup bearings disposed at least above and under the rotating shaft, and disposed to be more adjacent to the rotating shaft than the magnetic bearings. The magnetic bearings may be disposed closer to the rotor than the backup bearings.

Further, another aspect of the present invention provides a method of controlling driving of a motor including: a stator (110) including a plurality of teeth on which a plurality of coils are respectively wound; a rotor (120) disposed in the stator and rotating due to a magnetic field generated in the plurality of coils; a rotating shaft (125) extending in an axial direction of the rotor and horizontally disposed; and magnetic bearings (130, 135) configured to generate a magnetic force which levitates the rotating shaft upward.

The greatest current may be applied to the coil, forming the smallest angle with a gravitational acceleration direction among winding center axes on which the plurality of coils are respectively wound, to levitate the rotating shaft when a motor is initially driven.

Further, the greatest current may be applied to the coil, corresponding to the winding center axis disposed in a range forming a first angle (θ) with a line parallel to the gravitational acceleration direction among the winding center axes on which the plurality of coils are respectively wound, to levitate the rotating shaft when the motor is initially driven.

According to the method of controlling driving, the magnetic bearings may be controlled to generate a magnetic force after the currents are applied to the plurality of coils, and the magnitude of the current applied to the plurality of coils may be reduced when the magnetic force is generated in the magnetic bearings.

Advantageous Effects

In a motor driving device according to the present invention, when a rotor and a stator are initially aligned, it is possible to reduce a levitation force of magnetic bearings necessary for initially aligning the rotor and the stator by applying a greater current to a coil disposed farthest away from the ground among a plurality of coils than to other coils. Accordingly, since the rotor and the stator can be initially aligned with only magnetic bearings which generate a relatively small levitation force, the required performance of the magnetic bearings can be reduced. Accordingly, since a motor can normally operate using relatively inexpensive magnetic bearings, manufacturing costs and production costs of the motor driving device can be reduced.

Further, in the motor driving device according to the present invention, it is possible to reduce the magnitude of a levitation force generated in the magnetic bearings by generating an additional levitation force in the magnetic bearings after applying currents to the plurality of coils to generate the levitation force. Accordingly, sizes and manufacturing costs of the magnetic bearings can be reduced, and overall size and manufacturing costs of the motor can also be reduced. Further, more refrigerant can be accommodated or greater output can be realized in the motor using the free space generated by the reduction of the sizes of the magnetic bearings.

In addition, in the motor driving device according to the present invention, it is possible to apply the same control manner to motors by uniformly disposing a plurality of teeth provided in the stator so that positions of the plurality of teeth can be symmetrical to a reference line perpendicular to the ground. Accordingly, an initial manual setting process can be omitted in the same type motor, and a load of the magnetic bearings can be reduced to enhance the reliability of motor control.

Specific effects of the present invention will be mentioned together with the above-described effects while describing the following specific items for implementing the present invention.

[Reference numerals]

| 100: motor part | 105: housing |
| 107: support part | 110: stator |
| 120: rotor | 125: rotating shaft |
| 127: plate | 130: magnetic bearing |
| 140: backup bearing | 150: guide bearing |
| 200: controller | |

MODES OF THE INVENTION

The above-described purposes, characteristics, and advantages will be described below in detail with reference to the accompanying drawings, and accordingly, those skilled in the art may easily perform the technical spirit of the present invention. In a description of the present invention, when detailed descriptions of related technologies related to the present invention unnecessarily obscure the subject matter of the present invention, the detailed descriptions will be omitted. Hereinafter, preferable examplary implementations of the present invention will be described in detail with reference to the accompanying drawings. The same reference numerals are used for the same or similar components in the drawings.

Hereinafter, with reference to FIGS. 3 to 10, motor driving devices according to some examplary implementations of the present invention will be described.

Figure 3:
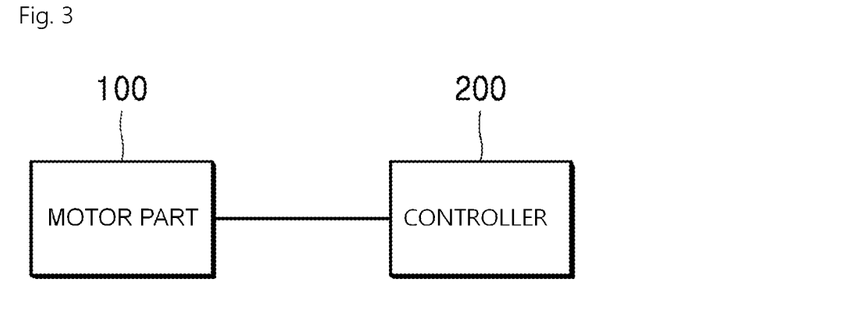
FIG. 3 is a block diagram illustrating a motor driving device according to one examplary implementation of the present invention.
Figure 4:
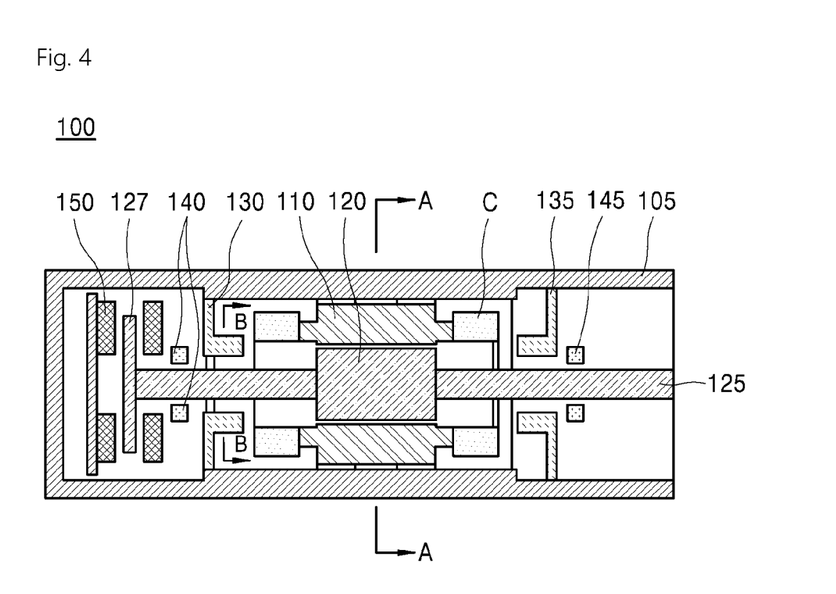
FIG. 4 is a cross-sectional view illustrating a motor part in FIG. 3.

FIG. 3 is a block diagram illustrating a motor driving device according to one examplary implementation of the present invention. FIG. 4 is a cross-sectional view illustrating a motor part in FIG. 3.

Referring to FIG. 3, the motor driving device according to one examplary implementation of the present invention includes a motor part 100 and a controller 200.

The motor part 100 includes various types of motors.

Specifically, the motor part 100 may include an alternating current (AC) motor, a direct current (DC) motor, a brushless DC motor, a reluctance motor, and the like.

For example, the motor part 100 may include a surface-mounted permanent-magnet synchronous motor (SMPMSM), an interior permanent magnet synchronous motor (IPMSM), a synchronous reluctance motor (SynRM), and the like.

The controller 200 may control an operation of the motor part 100. The controller 200 may control operations of components included in the motor part 100.

For example, the controller 200 may control the magnitude of currents applied to a plurality of coils C included in the motor part 100, and the magnitude of a magnetic force of magnetic bearings 130 which generates a levitation force which levitates a rotating shaft 125 connected to a rotor 120.

In this case, the controller 200 may reduce the magnitude of the magnetic force generated in the magnetic bearings 130 by adjusting the magnitude of currents applied to the plurality of coils C.

Detailed descriptions of the above will be described below.

Referring to FIG. 4, the motor part 100 includes a housing 105, a stator 110, the rotor 120, the rotating shaft 125, magnetic bearings 130 and 135, backup bearings 140 and 145, and guide bearings 150.

The housing 105 forms an exterior of the motor part 100 and is provided with a cylindrical inner space. In the inner space of the housing 105, the rotor 120, the rotating shaft 125, the magnetic bearings 130 and 135, the backup bearings 140 and 145, and the guide bearings 150 are accommodated.

In the drawings, the housing 105 is shown in a cylindrical shape of which one surface is open, but the present invention is not limited thereto, and the housing 105 may be formed in various shapes each provided with an inner space.

A side circumferential surface of the housing 105 may be disposed to be parallel to the ground. That is, one side surface of the housing 105 may be disposed to come into contact with a support surface (107 in FIG. 5) forming a bottom. Accordingly, the rotating shaft 125 may be horizontally aligned to be parallel to the support surface.

The stator 110 may include a circular ring-shaped body fixed to an inner circumferential surface of the housing 105, and a plurality of teeth 114 inwardly extending toward a center O from the circular ring-shaped body. The teeth may be disposed as a plurality along a circumference at the same interval. For example, as described above, three teeth may be disposed at intervals of 120°.

Figure 5:
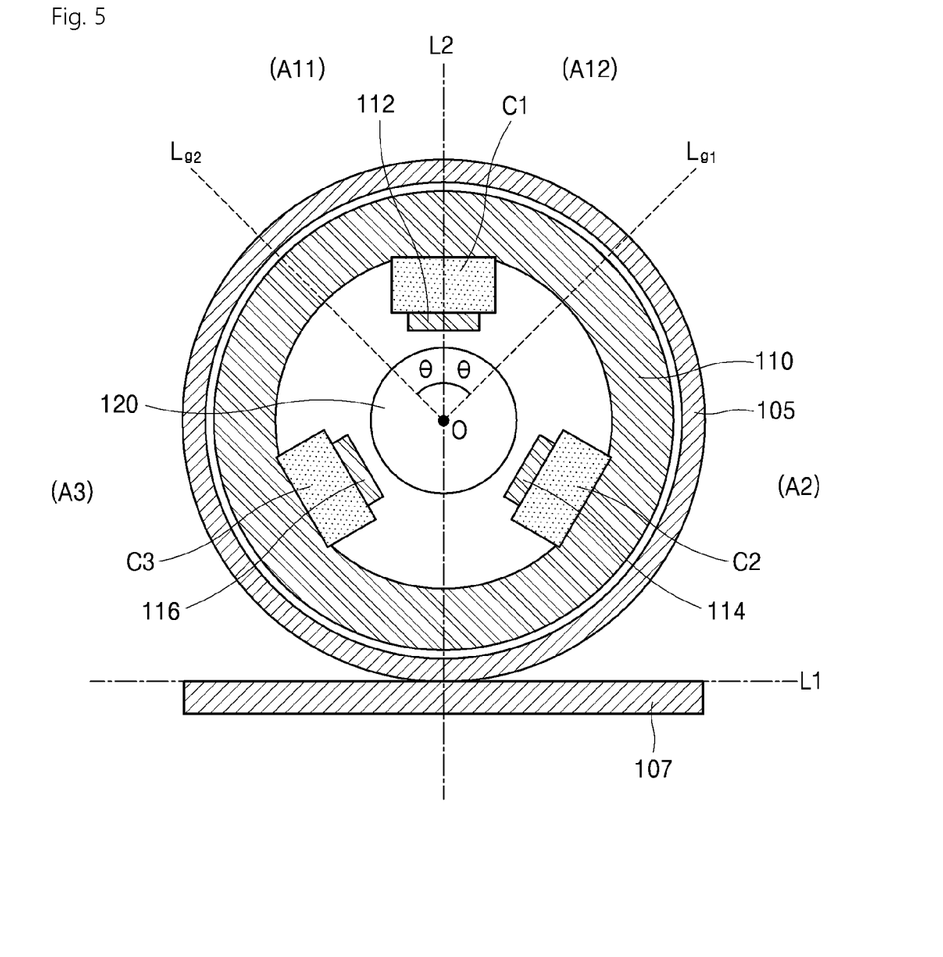
FIG. 5 is a cross-sectional view for describing a cross-section taken along line A-A in FIG. 4.

The stator may have a structure in which a plurality of metal plates shown in FIG. 5 are laminated along an axial direction O. The stator may be formed of a metal material which guides a magnetic force line. Coils C may be wound around the teeth of the stator in which the metal plates are laminated.

Different coils C1, C2, and C3 may be wound around the plurality of teeth. Currents having different phases are applied to the coils C, and thus a magnetic field which rotates the rotor 120 may be generated.

The rotor 120 is surrounded by the stator 110 and disposed in the stator 110. The rotor 120 rotates due to the magnetic field generated by the coils C wound on the stator 110. The rotor 120 is disposed at a center of the plurality of teeth of the stator 110.

The rotor 120 is composed of a magnetic material, and although not clearly shown in the drawings, may have different polarities. The rotor 120 may include a permanent magnet. Further, the rotor 120 may include a permanent magnet and a ferromagnetic material which guides a magnetic force line of the permanent magnet.

A side surface of the rotor 120, that is, an outer circumferential surface, may be disposed to be parallel to a bottom surface.

The rotating shaft 125 may extend from a center of the rotor 120 to both sides along an axial direction of the rotor 120. That is, a center of the rotating shaft 125 may coincide with the center of the rotor 120.

The rotor 120 may be fixed to the rotating shaft 125 to be integrally operated with the rotating shaft 125. The rotor 120 may integrally rotate with the rotating shaft 125. A diameter of the rotating shaft 125 may be formed smaller than a diameter of the rotor 120. The rotor 120 may be forcedly press-fitted onto an outer circumferential surface of the rotating shaft 125.

When the motor part 100 is operated, the rotor 120 formed of a magnetic material receives a rotational force by a changing magnetic field generated by the plurality of coils C wound on the stator 110. Accordingly, the rotor 120 and the rotating shaft 125 rotate in the stator 110. Since the rotor 120 is self-aligned by the rotational force generated due to rotation of the rotor 120, the center of the stator 110 and the center of the rotor 120 may coincide with each other.

On the other hand, when the motor part 100 stops, the rotor 120 moves downward from the center of the stator 110 due to the weight of the rotor 120 itself. In this case, the backup bearings 140 and 145 may limit a movement range of the rotor 120 so that the rotor 120 does not come into contact with an inner surface of the stator 110. The backup bearings 140 and 145 may be disposed on both sides with the rotor 120 interposed therebetween. The backup bearings 140 and 145 may respectively support portions of the rotating shaft 125 extending to both sides with the rotor 120 interposed therebetween. The backup bearings 140 and 145 may support the rotating shaft 125 in a radial direction.

In one examplary implementation, the backup bearings 140 and 145 may surround the outer circumferential surface of the rotating shaft 125 in a circumferential direction. In another examplary implementation, the backup bearings 140 and 145 may support the outer circumferential surface of the rotating shaft 125 from at least upper and lower portions, and each of the backup bearings 140 and 145 may have a vertically separated structure.

In one examplary implementation, the backup bearings 140 and 145 may rotatably support the rotating shaft 125 rotating with the rotor 120 in a radial direction when the rotor 120 rotates. In another examplary implementation, the backup bearings 140 and 145 may limit the downward displacement of the rotating shaft 125 when the rotor 120 does not rotate and thus the rotating shaft 125 descends together with the rotor 120 due to its own weight.

When the rotating shaft 125 and the rotor 120 descend due to the own weight, the center of the rotor 120 and the center of the stator 110 do not coincide with each other. In this case, the motor part 100 may be operated after an initial alignment process for matching the center of the rotor 120 and the center of the stator 110.

The magnetic bearings 130 and 135 generate a magnetic force which levitates the rotating shaft 125 upward. The magnetic bearings 130 may be composed of an electromagnet, and may generate a magnetic force of uniform magnitude by a constant electrical signal. The magnitude of the magnetic force generated by the magnetic bearings 130 may be controlled by the controller 200.

The magnetic bearings 130 and 135 may be disposed at both sides with the rotor 120 interposed therebetween. The magnetic bearings 130 and 135 may act on portions of the rotating shaft 125 extending to both sides with the rotor 120 interposed therebetween.

The magnetic bearings 130 and 135 may face the outer circumferential surface of the rotating shaft 125 in at least an upper side and a lower side of the rotating shaft 125.

The magnetic bearings 130 may be composed of two pieces separated into an upper portion and a lower portion. In this case, the upper portion may be disposed above the rotating shaft 125, and the lower portion may be disposed under the rotating shaft 125. However, this is only an example, and although not clearly shown in the drawings, the magnetic bearings 130 may be formed in a shape surrounding the outer circumferential surface of the rotating shaft 125.

Hereinafter, it will be described based on the magnetic bearings 130 separated into the upper and lower portions to be respectively disposed above and under the rotating shaft 125.

In addition, the magnetic bearings 130 and 135 may be respectively disposed at one side and the other side of the rotating shaft 125 with respect to the rotor 120, and may be disposed closer to the rotor 120 than the backup bearings 140 and 145. Since the magnetic bearings 130 and 135 raise the rotor 120 and the rotating shaft 125 which descend due to their own weights, the magnetic bearings 130 and 135 may be disposed adjacent to the rotor 120 where the most own weight is concentrated along a longitudinal direction of the rotating shaft 125. The backup bearings 140 and 145 may be disposed to be spaced apart from each other to some extent to enhance support stability when supporting the rotation of the rotating shaft 125.

In this case, the same current may be applied to both magnetic bearings 130 and 135 to generate a magnetic force having the same magnitude. Further, in some cases, different currents may be applied to both magnetic bearings 130 and 135 to generate magnetic forces having different magnitudes.

The backup bearings 140 serve to limit a maximum movement range of the rotating shaft 125. Accordingly, the rotor 120 does not come into contact with the inner surface of the stator 110, and the rotating shaft 125 does not come into contact with inner surfaces of the magnetic bearings 130.

The backup bearings 140 may be composed of two pieces separated into an upper portion and a lower portion like the magnetic bearings 130.

In this case, the backup bearings 140 may be disposed more adjacent to the rotating shaft 125 than the magnetic bearings 130. That is, an interval between the backup bearing 140 and the rotating shaft 125 may be smaller than an interval between the magnetic bearing 130 and the rotating shaft 125.

The guide bearings 150 serve to guide a position of the rotor 120 so that the rotor 120 is not separated from the stator 110.

A plate 127 is formed on one end of the rotating shaft 125. Here, the guide bearings 150 are disposed at one side and the other side with respect to the plate 127.

That is, among a pair of guide bearings 150, a first piece is disposed to face a first surface of the plate 127, and a second piece is disposed to face a second surface (a surface opposite the first surface) of the plate 127.

Constant currents are applied to the guide bearings 150 to generate a magnetic force on the plate 127. In this case, in the plate 127, attraction or repulsion is generated between the pair of guide bearings 150.

Accordingly, the plate 127 and the pair of guide bearings 150 may maintain a state spaced apart from each other. Accordingly, the pair of guide bearings 150 may limit the movement of the rotating shaft 125 in the axial direction. That is, the pair of guide bearings 150 may regulate the position of the rotating shaft 125 in the axial direction.

In this case, the magnitude of the magnetic force generated in the guide bearings 150 may be controlled by the controller 200.

However, the guide bearings 150 may be omitted in some examplary implementations.

FIG. 5 is a cross-sectional view for describing a cross-section taken along line A-A in FIG. 4.

Referring to FIG. 5, the housing 105 may be disposed so that one side surface of the housing 105 comes into contact with the support part 107. The one side surface of the housing 105 may be a lower surface of the housing 105.

Here, the support part 107 may be a bottom surface or an upper surface of an object.

The stator 110 may be disposed to be symmetrical with respect to a second straight line L2 (that is, a vertical line) perpendicular to a first straight line L1 which coincides with an upper surface of the support part 107. The second straight line L2 may be a normal line on the upper surface of the support part 107. The second straight line L2 may coincide with a gravitational acceleration direction.

As described above, the stator 110 includes a plurality of teeth 112, 114, and 116.

A first tooth 112 may be disposed on the second straight line L2 perpendicular to the support part 107. Accordingly, a virtual axis (a first winding center axis) forming a center of winding of the first coil C1 surrounding a circumference of the first tooth 112 may extend in a vertically upward and downward direction (that is, the gravitational acceleration direction).

In this case, the first tooth 112 may be disposed farthest from the upper surface of the support part 107 than a second tooth 114 and a third tooth and 116. The first tooth 112 may be disposed above the second tooth 114 and the third tooth 116 in the direction of gravity.

Further, in another examplary implementation of the present invention, the first tooth 112 may be disposed within a first angle θ based on the second straight line L2. In this case, the first angle θ may be an acute angle.

The first tooth 112 may be disposed between a first guide line $L_{g1}$ and a second guide line $L_{g2}$ each forming the first angle θ with the second straight line L2. Here, the first angle θ may be smaller than or equal to 60°, but the present invention is not limited thereto.

The first tooth 112 may be disposed in first regions A11 and A12 between the first guide line $L_{g1}$ and the second guide line $L_{g2}$.

The second tooth 114 may be disposed in the second region A2 between the first guide line $L_{g1}$ and the first straight line L1, and the third tooth 116 may be disposed in a third region A3 between the second guide line $L_{g2}$ and the first straight line L1.

In this case, the first coil C1 is wound around the first tooth 112, the second coil C2 is wound around the second tooth 114, and the third coil C3 is wound around the third tooth 116.

Accordingly, the virtual axis (the first winding center axis) forming the center of the winding of the first coil C1 surrounding the circumference of the first tooth 112 may be disposed between the first guide line $L_{g1}$ and the second guide line $L_{g2}$. A virtual axis (a second winding center axis) forming a center of winding of the second coil C2 surrounding a circumference of the second tooth 114 may be disposed between the first guide line $L_{g1}$ and the first straight line L1. Further, a virtual axis (a third winding center axis) forming a center of winding of the third coil C3 surrounding a circumference of the third tooth 116 may be disposed between the second guide line $L_{g2}$ and the first straight line L1. Accordingly, an axis forming the smallest angle with the gravitational acceleration direction may be the first winding center axis. When the first angle θ decreases, the angle formed by the first winding center axis and the gravitational acceleration direction tends to further decrease.

A current is applied to each of the coils C1, C2, and C3, and the controller 200 may control the current applied to each of the coils C1, C2, and C3. As the current is applied to each of the coils C1, C2, and C3, a magnetic field may be generated.

During an operation of the motor part 100, the controller 200 applies alternating currents of different phases to each of the coils C1, C2, and C3.

However, in an operation initializing step of the motor part 100, the controller 200 may align the stator 110 and the rotor 120 by applying DC currents having different magnitudes to each of the coils C1, C2, and C3.

In this case, the controller 200 may apply a greater current to the first coil C1 of the stator 110 than to the second coil C2 and the third coil C3.

In this case, since the attractive force between the first coil C1 and the rotor 120 is greater than the attractive force between the second coil C2 and the third coil C3 and the rotor 120, the rotor 120 may move to an upper side of the stator 110.

Accordingly, the controller 200 may match center axes of the stator 110 and the rotor 120.

Figure 6:
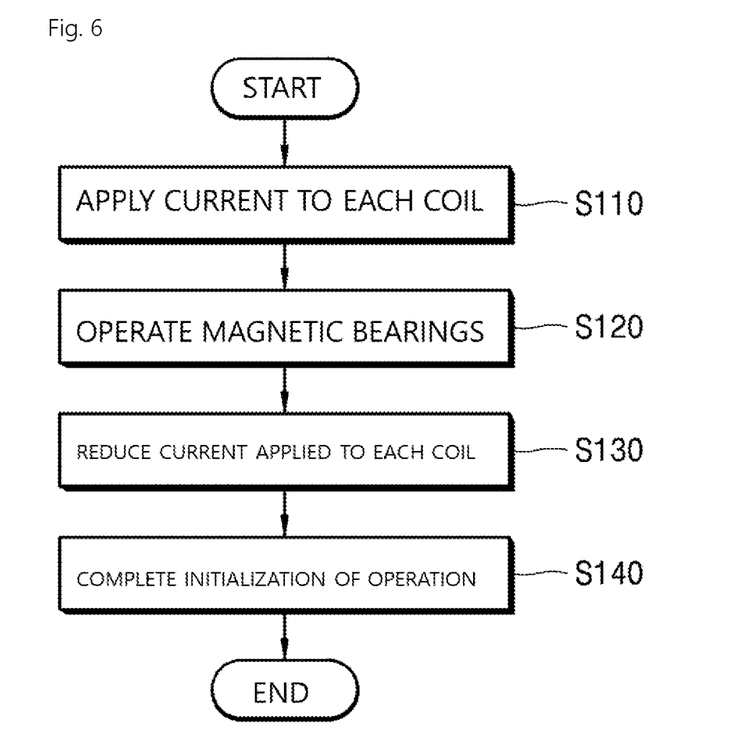
FIG. 6 is a flow chart for describing a method of controlling the motor driving device according to one examplary implementation of the present invention.
Figure 7:
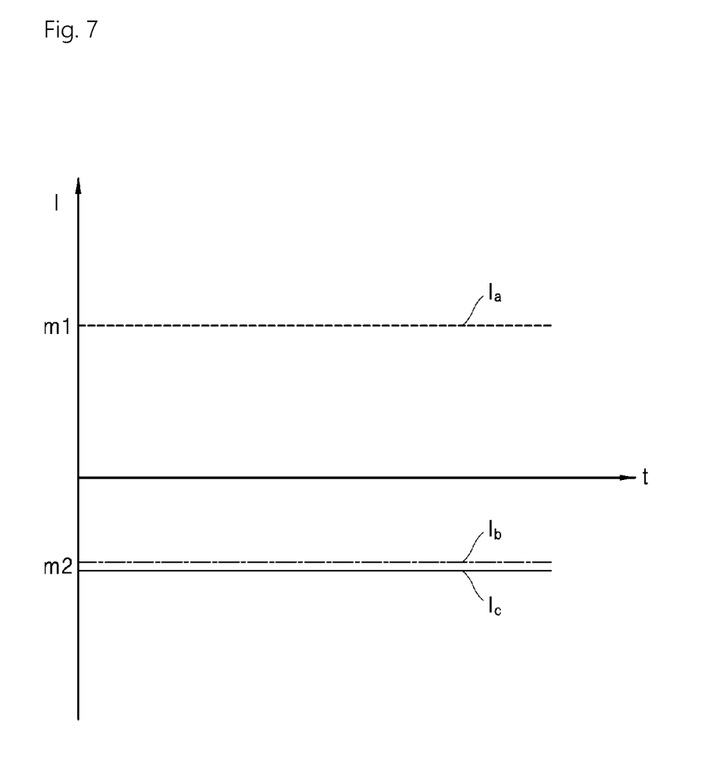
FIG. 7 is a graph for describing the magnitudes of currents applied in operation S110 in FIG. 6.

FIG. 6 is a flow chart for describing a method of controlling the motor driving device according to one examplary implementation of the present invention. FIG. 7 is a graph for describing the magnitudes of currents applied in operation S110 in FIG. 6.

Referring to FIG. 6, a control method for initializing driving of the motor driving device according to one examplary implementation of the present invention includes applying, by the controller 200, currents to each of the coils C1, C2, and C3 (S110).

In this case, the controller 200 applies different currents to each of the coils C1, C2, and C3. The controller 200 may apply different DC currents to each of the coils C1, C2, and C3.

Specifically, referring to FIG. 7, the controller 200 applies a first current $I_a$ to the first coil C1, and respectively applies second and third currents $I_b$ and $I_c$ to the second coil C2 and the third coil C3.

In this case, the magnitude m1 of the first current $I_a$ may be greater than the magnitude m2 of the second and third currents $I_b$ and $I_c$, and polarities may be opposite to each other.

For example, the magnitude m1 of the first current $I_a$ may be greater than twice the magnitude m2 of the second and third currents $I_b$ and $I_c$. Further, the first current $I_a$ may be a positive current, and the second and third currents $I_b$ and $I_c$ may be negative currents. However, this is only an example, and the present invention is not limited thereto.

Accordingly, the greatest force which pulls the rotor 120 is generated in the first coil C1, and the rotor 120 moves to the upper side of the stator 110.

The controller 200 may adjust the current applied to each of the coils C1, C2, and C3 to adjust the magnitude of the levitation force of the rotor 120 acting in the upward direction of the stator 110.

Subsequently, referring to FIG. 6 again, the controller 200 generates a magnetic force that levitates the rotating shaft 125 (S120) in the magnetic bearings 130 and 135.

In the operation S110, as the levitation force which moves the rotor 120 to the upper side of the stator 110 acts, the magnitude of the levitation force required in the magnetic bearings 130 may be reduced.

Accordingly, the magnitude of the magnetic force required in the magnetic bearings 130 may be reduced, and thus sizes and manufacturing costs of the magnetic bearings 130 may also be reduced.

Since the sizes and manufacturing costs of the magnetic bearings 130 are reduced, the size and manufacturing costs of the motor part 100 may also be reduced.

Subsequently, the controller 200 reduces the magnitude of the current applied to each of the coils C1, C2, and C3 (S130). Accordingly, the controller 200 may match the center axis of the rotor 120 with the center axis of the stator 110.

Subsequently, since the center axis of the rotor 120 and the center axis of the stator 110 coincide with each other, initialization of the operation of the motor part 100 is completed (S140). Subsequently, the controller 200 may rotate the rotor 120 in the stator 110 by applying AC power of different phases to each of the coils C1, C2, and C3.

The operation S130 among the above-described operations S110 to S140 may be omitted in some examplary implementations of the present invention.

Figure 8:
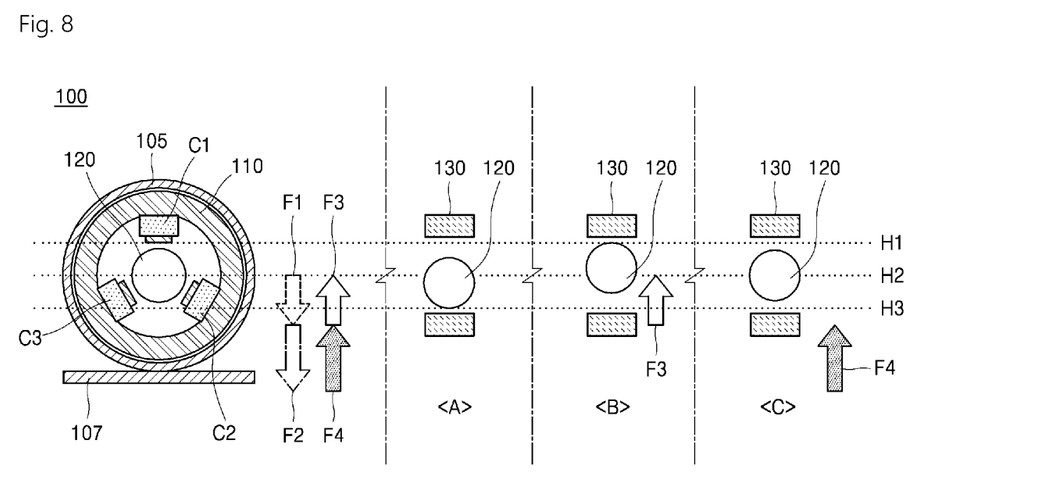
FIG. 8 is a view for describing a method of initially aligning the motor driving device according to one examplary implementation of the present invention.

FIG. 8 is a view for describing a method of initially aligning the motor driving device according to one examplary implementation of the present invention.

Referring to FIG. 8, in the motor driving device according to one examplary implementation of the present invention, the rotor 120 may move between an upper limit guide line H1 of the backup bearings 140 and a lower limit guide line H3 of the backup bearings 140.

A state A shows a case in which the motor part 100 is stopped. A first force F1 acting downward by the weight of the rotor 120 and a second force F2 acting between the rotor 120 formed of a magnetic material and the stator 110 formed of a metal material act on the rotor 120.

Due to the first force F1 and the second force F2, the rotor 120 moves downward from the center line H2 of the stator 110.

In this case, the second force F2 may increase when the rotor 120 becomes more distant from the center line H2. That is, when the motor part 100 is in a stopped state, the rotor 120 moves to be adjacent to the lower limit guide line H3.

In order to drive the motor in the stopped state, the center of the rotor 120 and the center of the stator 110 should coincide with each other.

Subsequently, in a state B, the controller 200 applies DC currents having different magnitudes to each of the coils C1, C2, and C3. Specifically, the controller 200 may apply a greater current to the first coil C1 of the stator 110 than to the second coil C2 and the third coil C3.

In this case, the attractive force between the first coil C1 and the rotor 120 becomes greater than the attractive force between the second coil C2 and the third coil C3 and the rotor 120, and thus the rotor 120 may move to the upper side of the stator 110.

That is, the rotor 120 receives a third force F3 by each of the coils C1, C2, and C3 to move to the upper side of the stator 110.

In the drawings, although a case in which the rotor 120 moves to be adjacent to the upper limit guide line H1 is illustrated, the present invention is not limited thereto. Even when the rotor 120 moves due to the third force F3, the center of the rotor 120 may still be located under the center line H2.

Subsequently, in a state C, the controller 200 generates a magnetic force that moves the rotating shaft 125 to the upper side of the stator 110 in the magnetic bearings 130. That is, a fourth force F4 acts on the rotor 120.

At the same time, the controller 200 may match the center axis of the rotor 120 with the center axis of the stator 110 by adjusting the magnitude of the current applied to each of the coils C1, C2, and C3.

In this case, a combined force of the first force F1 and the second force F2 is the same as a combined force of the third force F3 and the fourth force F4.

However, the magnitude of the second force F2 varies according to the position of the rotor 120 in the stator 110, and the magnitude of the magnetic force generated in the magnetic bearings 130 may not change linearly.

In order to compensate for this, the controller 200 may precisely adjust the current applied to each of the coils C1, C2, and C3 to match the center axis of the rotor 120 with the center axis of the stator 110.

Further, in an operation initializing process, since the controller 200 generates the third force F3 which moves the rotor 120 upward by applying the current to each of the coils C1, C2, and C3 first, the magnitude of the fourth force F4 generated in the magnetic bearings 130 may be reduced.

Accordingly, in the present invention, since the rotor 120 and the stator 110 may be initially aligned with only the magnetic bearings 130 which generate a relatively small levitation force, the required performance of the magnetic bearings 130 may be reduced.

Since the motor part 100 may normally operate even when provided with relatively inexpensive magnetic bearings 130, manufacturing costs and production costs of the motor driving device may be reduced.

Further, more refrigerant may be accommodated or greater output may be realized in the motor part 100 using the free space generated by the reduction of the sizes of the magnetic bearings 130.

In addition, the same control manner may be applied to a plurality of motor driving devices by disposing the plurality of teeth 112, 114, and 116 provided in the stator 110 so that the positions of the plurality of teeth 112, 114, and 116 may be symmetrical to a reference line perpendicular to the ground.

That is, in the motor part 100 according to the present invention, an initial manual setting process may be omitted by using the same initial alignment method, and a load of the magnetic bearings 130 may be reduced to enhance the reliability of motor control.

Figure 9:
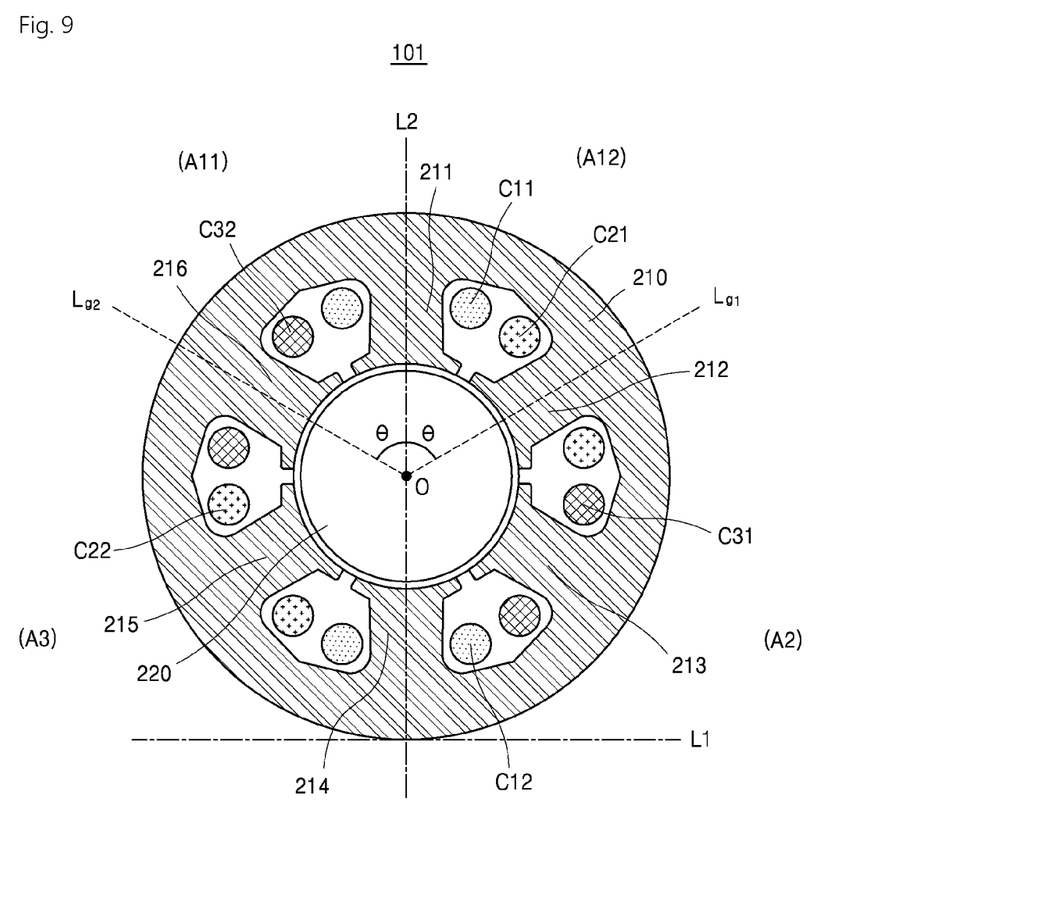
FIG. 9 is a cross-sectional view illustrating a motor driving device according to another examplary implementation of the present invention.
Figure 10:
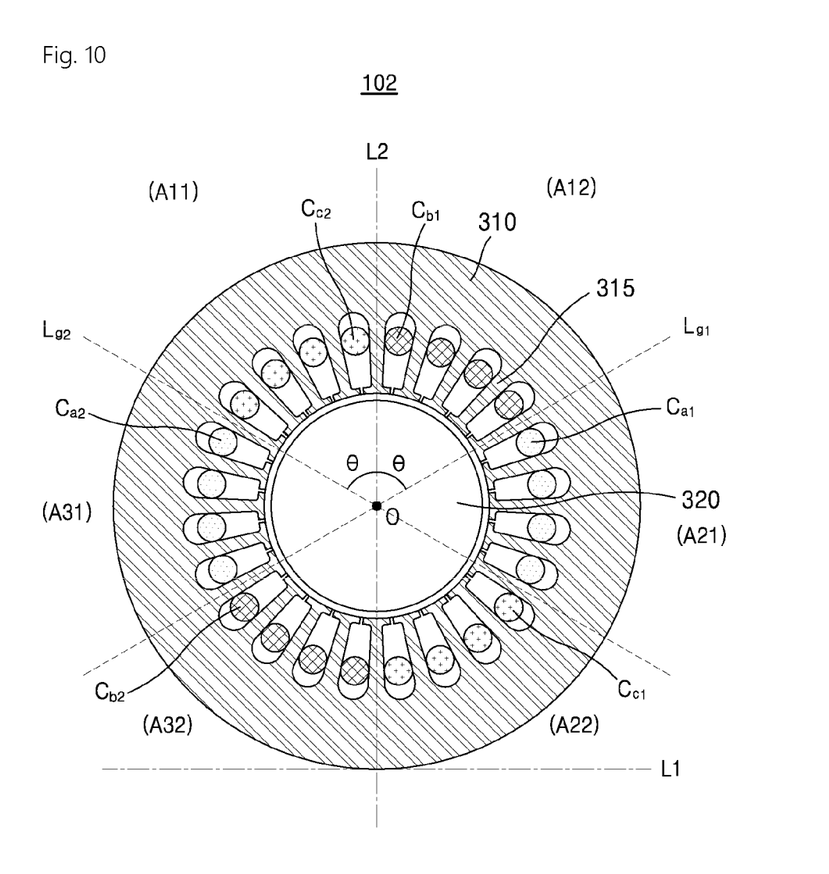
FIG. 10 is a cross-sectional view illustrating a motor driving device according to still another examplary implementation of the present invention.

FIG. 9 is a cross-sectional view illustrating a motor driving device according to another examplary implementation of the present invention. FIG. 10 is a cross-sectional view illustrating a motor driving device according to still another examplary implementation of the present invention. Hereinafter, a description of components the same as component in the motor driving device according to one examplary implementation of the present invention will be omitted and differences will be mainly described.

Referring to FIG. 9, a motor part 101 according to another examplary implementation of the present invention includes a stator 210 and a rotor 220.

The stator 210 includes a plurality of teeth 211, 212, 213, 214, 215, and 216.

For example, the stator 210 may include six teeth 211, 212, 213, 214, 215, and 216, and coils C11, C12, C21, C22, C31, and C32 may be individually wound around the plurality of teeth 211, 212, 213, 214, 215, and 216, respectively. In this case, the first coil C11 may be laterally wound around the first tooth 211.

Hereinafter, as shown in the drawings, an example in which the stator 210 has the six teeth 211, 212, 213, 214, 215, and 216 will be described.

Here, the first coil C11 is wound around the first tooth 211, and the fourth coil C12 is wound around fourth tooth 214 facing the first tooth 211.

In this case, the first tooth 211 and the fourth tooth 214 may be disposed on a second straight line L2 perpendicular to a first straight line L1 parallel to the ground.

As another example, the first tooth 112 may be disposed between a first guide line $L_{g1}$ and a second guide line $L_{g2}$ each forming a first angle θ with the second straight line L2.

Here, the first angle θ may be smaller than or equal to 60°, but the present invention is not limited thereto.

A virtual axis (a first winding center axis) forming a center of winding of the first coil C1 wound around the first tooth 211 and a virtual axis (a fourth winding center axis) forming a center of winding of the fourth coil C12 wound around the fourth tooth 214 may be disposed at an angle closest to the second straight line L2 (a gravitational acceleration direction) compared to other winding center axes. During an initial alignment operation of the motor part 100, the controller 200 may apply a greater DC current to the first coil C11 and the fourth coil C12 than to other coils C21, C22, C31, and C32.

In this case, a force directed toward an upper side of the stator 210 is applied to the rotor 220.

At this time, a direction of the force applied to the rotor 220 is perpendicular to a winding direction of the first coil C11 or the fourth coil C12.

Since the force applied to the rotor 220 may be easily understood by the 'Ampere's right-handed screw rule', hereinafter, a detailed description will be omitted.

Subsequently, although not clearly shown in the drawings, the controller 200 generates a magnetic force that levitates a rotating shaft 125 in magnetic bearings 130.

That is, in the present invention, the controller 200 may generate a force which moves the rotor 220 upward and reduce the magnitude of a force generated in the magnetic bearing 130 in an initial alignment process by first applying a greater DC current to the first coil C11 and the fourth coil C12 than to other coils C21, C22, C31, and C32.

In FIG. 10, a motor part 102 of a motor driving device according to still another examplary implementation of the present invention includes a stator 310 and a rotor 320.

The stator 310 includes a plurality of teeth 315. A plurality of coils Ca1, Ca2, Cb1, Cb2, Cc1, and Cc2 may be wound around the stator 310.

The coils Ca1, Ca2, Cb1, Cb2, Cc1, and Cc2 may be respectively wound around different regions A11, A12, A21, A22, A31, and A32 of the stator 310.

Here, the regions A11, A12, A21, A22, A31, and A32 may be set to the same size.

For example, a first coil Ca1 may be wound across the plurality of teeth 315 in a first region A21 of the stator 310 to alternate an inner surface and an outer surface with respect to a body of the stator 310.

Like the above, a second coil Ca2 may be wound across the plurality of teeth 315 in a second region A31 of the stator 310 to alternate the inner surface and the outer surface with respect to the body of the stator 310.

In this case, the first region A21 and the second region A31 may be disposed to be symmetrical to a second straight line L2 perpendicular to a first straight line L1 parallel to the ground.

Here, during an initial alignment operation of the motor part 100, the controller 200 may apply a greater DC current to the first coil Ca1 and the second coil Ca2 than to other coils Cb1, Cb2, Cc1, and Cc2.

In this case, a force directed toward an upper side of the stator 310 is applied to the rotor 320. In this case, a direction of the force applied to the rotor 320 is perpendicular to a winding direction of the first coil Ca1 or the second coil Ca2.

In this case, since the force applied to the rotor 320 may be easily understood by the 'Ampere's right-handed screw rule', hereinafter, a detailed description will be omitted.

Subsequently, although not clearly shown in the drawings, the controller 200 generates a magnetic force that levitates a rotating shaft 125 in magnetic bearings 130.

That is, in the present invention, the controller 200, by first, may generate a force which moves the rotor 220 upward and reduce the magnitude of a force generated in the magnetic bearing 130 in an initial alignment process by first applying a greater DC current to the first coil Ca1 and the second coil Ca2 than to other coils Cb1, Cb2, Cc1, and Cc2.

Accordingly, in the present invention, since the rotor 120 and the stator 110 may be initially aligned with only the magnetic bearings 130 which generate a relatively small levitation force, the required performance of the magnetic bearings 130 may be reduced.

Since the motor part according to some examplary implementations of the present invention may normally operate even when provided with relatively inexpensive magnetic bearings 130, manufacturing costs and production costs of the motor driving device may be reduced.

As described above, although the present invention is described with reference to the exemplified drawings, the present invention is not limited by the examplary implementations and the drawings disclosed in the specification, and it is apparent that various modifications may be performed within the scope of the technical spirit of the present invention by those skilled in the art. Further, although actions and effects according to the configurations of the present invention have not been explicitly described while describing the examplary implementations of the present invention in the above, it is natural that the predictable effects by the configurations should also be recognized.

What is claimed is:

1. A motor driving device comprising:
a housing;
a stator that is located on an inner surface of the housing and that includes a plurality of teeth on which a plurality of coils are wound respectively;
a rotor located in the stator and configured to rotate based on a magnetic field generated by the plurality of coils;
a rotating shaft that extends in an axial direction of the rotor and that is horizontally oriented relative to a support surface of the housing;
magnetic bearings configured to generate magnetic force that levitates the rotating shaft upward; and
a controller configured to apply currents to the plurality of coils and control operation of the magnetic bearings,
wherein the currents applied by the controller to the plurality of coils have different magnitudes,
wherein the plurality of teeth include a first tooth located above the rotating shaft, and
wherein a winding center axis of a first coil wound on the first tooth forms a smallest angle with a line parallel to a gravitational direction among angles formed by winding center axes of the plurality of coils and the plurality of teeth respectively.

2. The motor driving device of claim 1, wherein:
the plurality of teeth include a second tooth on which a second coil is wound and a third tooth on which a third coil is wound,
the first tooth, the second tooth, and the third tooth are located at an angle of the same interval according to the rotating shaft, and
the first tooth is located farther away from ground, as compared to the second tooth and the third tooth.

3. The motor driving device of claim 2, wherein the plurality of teeth include:
a fourth tooth located opposite to the first tooth according to the rotating shaft,
a fifth tooth located opposite to the second tooth according to the rotating shaft, and
a sixth tooth located opposite to the third tooth according to the rotating shaft.

4. The motor driving device of claim 1, wherein the first tooth is oriented perpendicular to ground on which the housing rests, or
wherein the first tooth is oriented parallel to the gravitational direction.

5. The motor driving device of claim 1, wherein:
the first tooth forms a first angle with a line oriented perpendicular to ground on which the housing rests, or a line oriented parallel to the gravitational direction, and
the first angle is smaller than or equal to 60°.

6. The motor driving device of claim 1, further comprising backup bearings located at least above or under the rotating shaft, and disposed to be the backup bearings being closer to the rotating shaft than the magnetic bearings.

7. The motor driving device of claim 6, wherein the magnetic bearings are located closer to the rotor than the backup bearings.

8. A method to control a motor driving device, comprising:
winding a plurality of coils respectively on a plurality of teeth that included in a stator;
rotating, based on a magnetic field generated by the plurality of coils, a rotor located in the stator;
extending a rotating shaft in an axial direction of the rotor, the rotating shaft being horizontally oriented relative to a support surface of the housing; and
generating, by magnetic bearings, magnetic force that levitates the rotating shaft upward;
wherein a largest current is applied to a coil, based on a motor being initially driven, to form a smallest angle with a line oriented parallel to a gravitational direction among angles formed by winding center axes of the plurality of coils and the plurality of teeth respectively, to levitate the rotating shaft.

9. The method of claim 8, wherein the coil corresponds to the winding center axis and is located in a range to form a first angle with a line oriented parallel to the gravitational direction among angles formed by the winding center axes of the plurality of coils and the plurality of teeth respectively, to levitate the rotating shaft.

10. The method of claim 8, wherein:
the magnetic bearings are configured to generate, based on currents being applied to the plurality of coils, magnetic force, and
based on the magnetic force being generated in the magnetic bearings, a magnitude of the current applied to the plurality of coils is reduced.

11. A motor driving device comprising:
a housing;
a stator that is located on an inner surface of the housing and that includes a plurality of teeth on which a plurality of coils are wound respectively;
a rotor located in the stator and configured to rotate based on a magnetic field generated by the plurality of coils;
a rotating shaft that extends in an axial direction of the rotor;
magnetic bearings configured to generate a magnetic force that levitates the rotating shaft upward; and
a controller configured to apply currents to the plurality of coils and control operation of the magnetic bearings,
wherein the controller is configured to apply a largest current to a coil, among the plurality of coils, that is located farthest away from ground on which the housing rests.

12. The motor driving device of claim 11, wherein:
the plurality of teeth include a first tooth on which a first coil is wound, a second tooth on which a second coil is wound, and a third tooth on which a third coil is wound, and
the first tooth is located farther away from the ground, as compared to the second tooth and the third tooth.

13. The motor driving device of claim 12, wherein the first tooth is oriented perpendicular to the ground on which the housing rests.

14. The motor driving device of claim 12, wherein:
the first tooth is located in a range to form a first angle with a line oriented perpendicular to the ground on which the housing rests.

15. The motor driving device of claim 14, wherein:
the first angle is smaller than or equal to 60°.

16. The motor driving device of claim 12, wherein:
the controller is configured to apply a larger current to the first coil than the second coil and the third coil.

17. The motor driving device of claim 11, wherein:
the controller is configured to apply direct currents (DC) that have different magnitudes to each of the plurality of coils to move the rotor to an upper side of the stator.

18. The motor driving device of claim 17, wherein:
a direction of winding center axis of the coil to which the greatest current is applied is perpendicular to a direction of a force that acts on the rotating shaft.

19. The motor driving device of claim 11, wherein the controller is configured to control the magnetic bearings to:
generate, based on the currents that are applied to the plurality of coils, magnetic force, and
reduce, based on the magnetic force being generated in the magnetic bearings, the magnitude of the current applied to the plurality of coils.

20. The motor driving device of claim 11, further comprising backup bearings located at least above or under the rotating shaft, the backup bearings being closer to the rotating shaft than the magnetic bearings.

* * * * *